Patented May 7, 1946

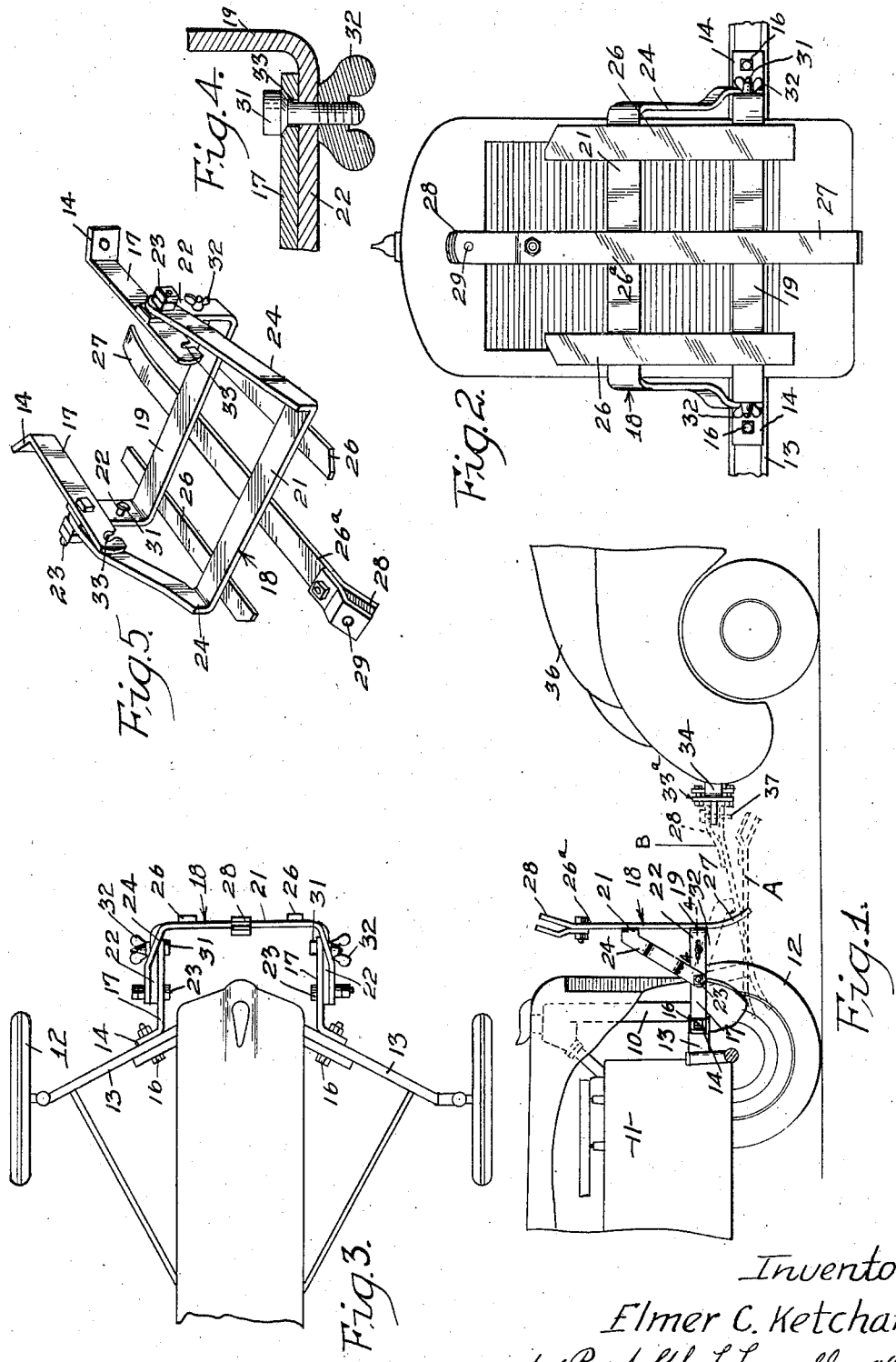

2,399,810

UNITED STATES PATENT OFFICE 2,399,810

COMBINATION RADIATOR GUARD AND TOW UNIT FOR MOTOR VEHICLES

Elmer C. Ketcham, Spencer, Iowa

Application September 19, 1945, Serial No. 617,354

3 Claims. (Cl. 280—33.14)

This invention relates generally to motor vehicles, and in particular to a combination radiator guard and tow unit for a farm tractor.

Farm tractors are commonly used for pushing implements and vehicles into barns and machine sheds for storage purposes. However, tractors now in general use are usually without any radiator guard and oftentimes the radiator and front end portions of the tractor are seriously damaged during such pushing operations.

Further it is not an uncommon practice among farmers to have their homes located several miles from the fields in which they work. Transportation between the home and the field is usually limited to the farm tractor so that travel is not only relatively slow, but if the farmer wishes to return home for any reason the tractor must first be disconnected from the implement with which he happens to be working in the field. More objectionable is the fact that in the event of a tractor breakdown the farmer is left without any means of transportation for returning home, or for traveling to a neighborhood shop for repair purposes. All of these conditions thus result in a loss of time which, during rush farming seasons, a farmer can ill afford.

It is an object of this invention, therefore, to provide an improved combination radiator guard and tow unit for a motor vehicle.

Another object of this invention is to provide a combination guard and tow unit for a tractor which is easily and quickly convertible from a guard to a tow means without requiring extra parts to make the conversion.

A further object of this invention is to provide a combination radiator guard and tow unit for a tractor which is adapted to be assembled on the tractor in a manner such that when the unit is used as a tow means for connecting the tractor to a towing vehicle, such as an automobile, the tractor is self-following relative to the towing vehicle.

Yet another object of this invention is to provide a combination radiator guard and tow unit, which is of a simple and rugged construction, easily installed on present commercial type tractors, efficient in operation, and capable of being used as a front loading platform for carrying sacked grain, small machinery parts and the like.

A feature of this invention is found in the provision of a combination radiator guard and tow unit for a tractor in which a pivoted frame is pivotally supported at its lower end adjacent the bottom of and forwardly of the tractor radiator, and is provided at its upper end with a hitch portion adapted to be connected with a towing vehicle. The frame is locked in an upright position when used as a guard, and is pivotally movable in an up and down direction in an extended position forwardly of the tractor when used as a tow means.

Further objects, features and advantages of this invention will become apparent from the following description when taken in connection with the accompanying drawing in which:

Fig. 1 is a side elevation of the front portion of a tractor and the rear portion of an automobile showing the assembly of the combination unit of this invention on the tractor and its connection with the automobile when used as a tow means; with parts of the tractor being broken away for the purpose of clarity;

Fig. 2 is a front end view of a portion of a tractor with the combination unit of this invention shown assembled thereon;

Fig. 3 is a fragmentary plan view of a part of the front end portion of a tractor with the combination unit thereon;

Fig. 4 is a fragmentary sectional view taken on the line 4—4 of Fig. 1 showing a detail of the combination unit; and Fig. 5 is a plan perspective view of the combination unit of this invention shown in its position when used as a tow means.

With reference to the drawing the combination radiator guard and tow unit of this invention is shown in Figs. 1, 2 and 3 in assembly relation with a tractor having a radiator 10, an engine 11 and front wheels 12 mounted on an axle 13. The combination unit includes a pair of substantially right angle supports 14 connected to the axle 13 by bolts 16, and arranged at opposite sides of the radiator 10 with their legs 17 extended forwardly from the radiator. As appears in Fig. 1 the connections of the supports 14 with the axle 13 are in positions adjacent to the bottom of the radiator 10.

A pivoted frame, indicated generally as 18, is comprised of a lower transverse member 19 and an upper transverse member 21 (Fig. 2). The member 19 is of a generally U-shape (Fig. 5) and has rearwardly extended legs 22 pivotally supported on bolts 23 carried in the legs 17 of the supports 14, and located rearwardly from the front ends of the legs 17.

The upper transverse member 21 (Figs. 1 and 5) has rearwardly and downwardly inclined end or leg portions 24 the rear ends of which terminate substantially at the rear ends of the legs 22 of the lower frame member 19. The rear ends of the legs 24 are also pivoted on the bolts 23 so that the lower end of the frame 18 is pivotally supported on the supports 14 for pivotal up and down movement forwardly of the radiator 10.

The transverse frame members 19 and 21 are rigidly connected together by upright brace members 26, illustrated as three in number, which brace members are secured to the members 19 and 21 by welding or like suitable means. The center brace, indicated as 26a, is of a longer length than the side braces 26 and has its lower end 27 bent forwardly and downwardly for a purpose which will appear later (Fig. 1). A hitch portion 28 at the upper end of the center brace 26a has openings 29 for receiving a usual hitch pin 37 for connecting the frame 18 with a towing vehicle.

When the unit of this invention is used as a combination guard and bumper the frame 18 is moved to its upright position, shown in Figs. 1 and 2, in which the legs 22 of the lower member 19 are positioned opposite corresponding legs 17 of the supports 14. The frame 18 is locked in an upright position against pivotal movement by bolts 31 extended through the legs 22 adjacent their forward ends and provided with wing nuts 32 (Figs. 1 and 4). On movement of the legs 22 to positions opposite the legs 17 the bolts 31 are receivable in slots 33 formed adjacent the front ends of the legs 17 and open to the bottom sides of such legs (Fig. 5). The bolts 31 are initially received in the slots 33, when the wing nuts 32 are loose on the bolts and the legs 22 and legs 17 are then rigidly connected together by tightening the wing nuts 32.

By virtue of the slots 33 being open to the bottom sides of the legs or end portions 17 any force applied in a rearward direction on the frame 18 tends to move the bolts 31 against the closed ends of the slots 33 whereby the frame 18 is positively held against rearward movement toward the radiator 10. Any rearward force applied on the frame 18 is also counteracted by the bracing action of the legs 24 of the frame member 21, in a manner clearly apparent from a consideration of Fig. 1, with such force being transmitted through the legs 24 to the bolts 23 carried in the legs 17 of the supports 14. As a result the frame 18 provides a positive guard for the radiator 10 and is capable of being used as a bumper for pushing relatively heavy loads without fear of damage to the tractor.

In the use of the combination unit of this invention as a hitch or tow bar the wing nuts 32 are loosened and the bolts 31 removed from the slots 33. This removal of the bolts 31 from the slots 33 permits a free up and down pivotal movement of the frame 18 in a forwardly extended position. As illustrated in Fig. 5 and in dotted lines at B in Fig. 1, the hitch portion 28 is in a position for ready connection with a hitch member, indicated generally as 33a in Fig. 1, and illustrated as being carried on the rear bumper 34 of a usual automobile 36. The hitch portion 28 and hitch member 33a are connected together by the hitch pin 37.

Because of the spaced relation of the supports 14 transversely of the tractor the frame 18 functions as a towbar such that the tractor is capable of trailing the automobile in a following relation without requiring an operator on the tractor. By virtue of the bent construction of the lower end 27 of the center brace 26a sufficient clearance takes place between the brace 26a and the bottom forward end of the tractor to provide for a free pivotal action of the frame 18 when the tractor is towed over relatively rough ground.

It is seen, therefore, that the conversion of the unit of this invention from a radiator guard and bumper to a towbar is simply accomplished by merely unloosening the wing nuts 32 and permitting the frame 18 to pivot about the bolts 23. Likewise the conversion of the unit from a towbar to a radiator guard and bumper is made by merely pivoting the frame 18 upwardly until the bolts 31 are received within the slots 33, at which time the wing nuts 32 are tightened to hold the frame 18 in an upright position against pivotal movement. As a result a minimum of time is required for the conversion and the tractor is readily connected for towing by an automobile, with complete safety.

The frame 18 may also be used as a loading platform or shelf by being permitted to drop downwardly to its dotted line position indicated at A and in Fig. 1, at which position the lower bent end 27 of the center brace 26a is in abutting engagement with the lower front end of the engine 11. In this position sacked grain, and other bulk articles may be supported on the frame 18 in front of the tractor for transport purposes.

By the use of this invention a tractor is readily adapted to perform additional jobs about a farm, with a resultant saving in time to the farmer. When the tractor is towed to a field, the towing car is available to the farmer for emergency trips or when he is at work in a field many miles from his home, for trips to his home without interfering in any way with the assembly of the tractor to any farm implement to which it may be connected.

Although the invention has been specifically described and illustrated as having the supports 14 carried on the front axle 13 of the tractor it is apparent that it may be used on the so-called "tricycle" tractors, in which a single front wheel or dual front wheels are carried immediately below the front end of the tractor, by merely connecting supports, corresponding to the supports 14, on the tractor frame. Further although the frame 18 has been described as including three brace members 26, the number of braces and their spaced arrangement may be varied depending upon the tractor size and the location of the engine crank for the tractor.

Thus although the invention has been described with respect to a preferred embodiment thereof it is to be understood that it is not to be so limited since changes and modifications in the parts and in their relative arrangement, can be made therein which are within the full intended scope of the invention as defined in the appended claims.

I claim:

1. A combination radiator guard and loading platform comprising a pair of transversely spaced supports carried on the vehicle and projected forwardly therefrom, a pivoted frame including a lower transverse frame member having rearwardly extending end portions, means pivoting said end portions on said supports, an upper transverse frame member having downwardly and rearwardly inclined end portions pivoted on said pivoting means, brace members rigidly connected between said upper and lower transverse members, means for releasably locking said end portions with said supports to hold said pivoted frame in an upright position forwardly of said radiator, said pivoted frame, on release of said locking means, being pivotally movable downwardly and forwardly from said upright position, and means for limiting the downward pivotal movement of said pivoted frame at a position extended forwardly from said vehicle.

2. A combination front guard and tow unit for a motor vehicle comprising a pair of transversely spaced supports adapted to be carried on the vehicle and projected forwardly therefrom, a pivoted frame pivoted adjacent one end on said supports for pivotal up and down movement forwardly of the vehicle, a hitch portion at the free end of said pivoted frame, and means for releasably locking said frame in an upright position against pivotal movement so that said frame serves as a guard for the front end of said vehicle, said hitch portion, on release of said locking means, being connectible with a tractor unit whereby said frame constitutes a pivoted tow means.

3. A combination radiator guard and tow unit for a motor vehicle including a pair of transversely spaced supports adapted to be carried on said vehicle adjacent the bottom of the vehicle radiator, and with their front ends extended forwardly from the vehicle radiator, a pivoted frame including a lower transverse member having rearwardly extended end portions, means pivotally supporting said end portions on said supports at positions spaced rearwardly from the front ends of said supports, an upper transverse member having rearwardly and downwardly inclined end portions terminating substantially at the rear ends of said lower member end portions, with the free ends of said inclined portions being pivoted on said supporting means, a brace member connected between said lower and upper members, a hitch portion at the upper end of said brace member, and means connectible with the forward ends of said lower member end portions and the forward ends of said supports to releasably lock said frame in an upright position against pivotal movement, whereby the frame serves as a guard for said radiator, with said frame, on release of said locking means, being pivotally movable up and down forwardly of said radiator to provide for the connection of said hitch portion with a towing vehicle.

ELMER C. KETCHAM.